US008964232B2

(12) United States Patent
Itogawa

(10) Patent No.: US 8,964,232 B2
(45) Date of Patent: Feb. 24, 2015

(54) IMAGE RECORDING SYSTEM, IMAGE RECORDING APPARATUS, AND COMPUTER READABLE MEDIUM

(71) Applicant: Yoshihiro Itogawa, Mizuho (JP)

(72) Inventor: Yoshihiro Itogawa, Mizuho (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/178,933

(22) Filed: Feb. 12, 2014

(65) Prior Publication Data

US 2014/0240764 A1   Aug. 28, 2014

(30) Foreign Application Priority Data

Feb. 28, 2013   (JP) .................................. 2013-039791

(51) Int. Cl.
*G06F 15/00*    (2006.01)
*G06F 3/12*     (2006.01)
*G06K 1/00*     (2006.01)

(52) U.S. Cl.
CPC ............ *G06F 3/1236* (2013.01); *G06F 3/1211* (2013.01)
USPC ......................................... 358/1.15; 358/1.1

(58) Field of Classification Search
CPC .............................. G06F 3/1236; G06F 3/1211
USPC .................................. 358/1.1, 1.15, 1.13, 1.14
See application file for complete search history.

(56) References Cited

U.S. PATENT DOCUMENTS

2007/0093265 A1*  4/2007  Krykun ......................... 455/557
2010/0069008 A1*  3/2010  Oshima et al. ................ 455/41.3

FOREIGN PATENT DOCUMENTS

JP    2006-163791 A    6/2006
JP    2008-87415 A     4/2008

* cited by examiner

*Primary Examiner* — Douglas Tran
(74) *Attorney, Agent, or Firm* — Merchant & Gould PC

(57) ABSTRACT

When first wireless communication is established, a mobile terminal sends image data specific information for specifying a set of image data to an image recording apparatus by the first wireless communication. When a set of image data associated with the image data specific information corresponding to the image data specific information received by the first wireless communication is stored, an image recording apparatus records an image corresponding to the stored set of image data onto a recording medium. When such a set of image data is not stored, the image recording apparatus receives the set of image data from the mobile terminal by the second wireless communication and records an image corresponding to the received set of image data onto the recording medium. The image recording apparatus then stores the received set of image data and the image data specific information in association with each other.

12 Claims, 10 Drawing Sheets

FIG.3A

PRINT INSTRUCTION INFORMATION

| COMMUNICATION SETTING INFORMATION | | PRINT SETTING INFORMATION | | |
|---|---|---|---|---|
| ADDRESS INFORMATION | AUTHORIZATION INFORMATION | IMAGE DATA SPECIFIC INFORMATION | USER INFORMATION | PRINT CONDITION INFORMATION |

FIG.3B

IMAGE DATA INFORMATION

| IMAGE SPECIFIC INFORMATION | USER INFORMATION | IMAGE RECORDING COMPLETION TIME |
|---|---|---|
| DATA NAME A | USER A | DECEMBER 15, 2012 11:30 |
| DATA NAME B | USER B | DECEMBER 15, 2012 13:40 |
| DATA NAME C | USER A | DECEMBER 15, 2012 15:20 |
| DATA NAME D | USER B | DECEMBER 15, 2012 19:20 |
| DATA NAME E | USER A | DECEMBER 15, 2012 20:30 |
| DATA NAME A | USER C | DECEMBER 16, 2012 11:30 |
| DATA NAME F | USER A | DECEMBER 16, 2012 11:40 |
| ... | ... | ... |

IMAGE RECORDING SYSTEM, IMAGE RECORDING APPARATUS, AND COMPUTER READABLE MEDIUM

CROSS REFERENCE TO RELATED APPLICATION

The present application claims priority from Japanese Patent Application No. 2013-039791, which was filed on Feb. 28, 2013, the disclosure of which is incorporated herein by reference in its entirety.

BACKGROUND OF THE INVENTION

Field of the Invention

The present invention relates to an image recording system, an image recording apparatus, and a computer readable medium.

A known image recording system is arranged so that image data stored in a mobile terminal is sent to an image recording apparatus and image recording regarding the image data is performed in the image recording apparatus. For example, a known image recording system is configured to be able to conduct wireless communication between a mobile terminal and an image recording apparatus, by means of two communication functions which are different from each other in terms of the capacity. In this image recording system, by the second communication function having a relatively small capacity, setting information for setting the connection by the first communication function and path information for specifying a set of image data (document) are transmitted from the mobile terminal to the image recording apparatus. The image recording apparatus then performs connection setting by using the received information with the first communication function having a relatively large capacity, and sends, to the mobile terminal, an acquisition request of the set of image data specified in the path information. Thereafter, by means of the first communication function, the image recording apparatus receives the image data corresponding to the path information from the mobile terminal, and performs the recording process.

SUMMARY OF THE INVENTION

However, the image recording system described above is disadvantageous in that, each time the image recording apparatus acquires the path information by the second communication function, the acquisition request is sent to the mobile terminal and the image data is supplied from the mobile terminal, with the result that the burden of the communications process between the mobile terminal and the image recording apparatus is large.

An aspect of the present invention is therefore to provide an image recording system, an image recording apparatus, and a computer readable medium, which are capable of reducing the burden of a communications process between a mobile terminal and an image recording apparatus.

According to an embodiment, an image recording system includes: a mobile terminal data storage configured to store a set of image data and image data specific information for specifying the set of image data in association with each other; a mobile terminal first communication unit configured to execute data communication with the image recording apparatus by first wireless communication which is established when the distance between the mobile terminal and the image recording apparatus becomes equal to or shorter than a predetermined communication range; a mobile terminal second communication unit configured to execute data communication with the image recording apparatus by second wireless communication which is established based on communication setting information of each of the mobile terminal and the image recording apparatus and is higher in a transmission rate than the first wireless communication; and a mobile terminal control unit configured to control the mobile terminal first communication unit and the mobile terminal second communication unit.

The image recording apparatus includes: an image recording apparatus first communication unit configured to execute data communication with the mobile terminal by the first wireless communication; an image recording apparatus second communication unit configured to execute data communication with the mobile terminal by the second wireless communication; an image recording apparatus storage unit configured to store the set of image data and the image data specific information in association with each other; an image recording unit configured to record an image corresponding to the set of image data onto the recording medium; and an image recording apparatus control unit configured to control the image recording apparatus first communication unit, the image recording apparatus second communication unit, and the image recording unit.

The mobile terminal control unit is configured to execute at least one of transmission of the communication setting information regarding the mobile terminal and reception of the communication setting information regarding the image recording apparatus by the first wireless communication and control the mobile terminal first communication unit to send the image data specific information to the image recording apparatus by the first wireless communication, and control the mobile terminal second communication unit to send the set of image data which is specified by the image data specific information and stored in the mobile terminal data storage to the image recording apparatus by the second wireless communication, when at least one of the mobile terminal first communication unit and the mobile terminal second communication unit receives a transmission request of the set of image data specified by the image data specific information.

The image recording apparatus control unit is configured to, when the image recording apparatus first communication unit receives the image data specific information, control the image recording unit to record an image corresponding to the set of image data stored in the image recording apparatus storage unit onto the recording medium, when the image recording apparatus storage unit stores the set of image data associated with the image data specific information corresponding to the image data specific information received by the image recording apparatus first communication unit, and when the image recording apparatus storage unit does not store the set of image data associated with the image data specific information corresponding to the image data specific information received by the image recording apparatus first communication unit, control the image recording apparatus first communication unit to send the transmission request to the mobile terminal by the first wireless communication and/or control the image recording apparatus second communication unit to send the transmission request to the mobile terminal by the second wireless communication, control the image recording unit to record an image corresponding to the set of image data received by the image recording apparatus second communication unit onto the recording medium in response to the transmission request, and store, in the image recording apparatus storage unit, the set of image data received by the image recording apparatus second communication unit and the image data specific information received by the image recording apparatus first communication unit in association with each other.

According to an embodiment of the present invention, an image recording apparatus capable of communicating with a mobile terminal includes: an image recording apparatus first communication unit configured to execute data communication with the mobile terminal by first wireless communication which is established when the distance between the mobile terminal and the image recording apparatus becomes equal to or shorter than a predetermined communication range; an image recording apparatus second communication unit configured to execute data communication with the mobile terminal by second wireless communication which is established based on communication setting information of each of the mobile terminal and the image recording apparatus and is higher in a transmission rate than the first wireless communication; an image recording apparatus storage unit configured to store a set of image data supplied from the mobile terminal and image data specific information by which the set of image data is specified, in association with each other; an image recording unit configured to record an image corresponding to the set of image data onto a recording medium; and an image recording apparatus control unit configured to control the image recording apparatus first communication unit, the image recording apparatus second communication unit, and the image recording unit.

The image recording apparatus control unit is configured to receive the image data specific information transmitted from the mobile terminal by the image recording apparatus first communication unit, receive the set of image data transmitted from the mobile terminal by the image recording apparatus second communication unit, and when the image data specific information transmitted from the mobile terminal is received by the image recording apparatus first communication unit, control the image recording unit to record an image corresponding to the set of image data stored in the image recording apparatus storage unit onto the recording medium, when the image recording apparatus storage unit stores the set of image data associated with the image data specific information corresponding to the image data specific information received by the image recording apparatus first communication unit, and control the image recording apparatus first communication unit to send a transmission request requesting the transmission of the set of image data specified by the image data specific information to the mobile terminal by the first wireless communication and/or control the image recording apparatus second communication unit to send the transmission request to the mobile terminal by the second wireless communication, when the image recording apparatus storage unit does not store the set of image data associated with the image data specific information corresponding to the image data specific information received by the image recording apparatus first communication unit, control the image recording unit to record, onto the recording medium, an image corresponding to the set of image data supplied from the mobile terminal to the image recording apparatus second communication unit in response to the transmission request, and store, in the image recording apparatus storage unit, the set of image data received by the image recording apparatus second communication unit and the image data specific information received by the image recording apparatus first communication unit in association with each other.

According to an embodiment of the present invention, a non-transitory computer readable medium storing a control program executed by an image recording apparatus includes: an image recording apparatus first communication unit configured to execute data communication by first wireless communication which is established when the distance between a sender and a receiver is shorter than a predetermined communication range; an image recording apparatus second communication unit configured to execute data communication by second wireless communication which is established based on communication setting information of each of the sender and the receiver and is higher in a transmission rate than the first wireless communication; an image recording apparatus storage unit configured to store a set of image data and image data specific information for specifying the set of image data in association with each other; and an image recording unit configured to record an image corresponding to the set of image data onto a recording medium.

When the image recording apparatus executes the control program, the image recording apparatus first communication unit receives the image data specific information from the mobile terminal, the image recording apparatus second communication unit receives the set of image data from the mobile terminal, and when the image recording apparatus first communication unit receives the image data specific information transmitted from the mobile terminal, the image recording unit is controlled to record an image corresponding to the set of image data stored in the image recording apparatus storage unit onto the recording medium, when the image recording apparatus storage unit stores the set of image data associated with the image data specific information corresponding to the image data specific information received by the image recording apparatus first communication unit.

When the image recording apparatus storage unit does not store the set of image data associated with the image data specific information corresponding to the image data specific information received by the image recording apparatus first communication unit, the image recording apparatus first communication unit is controlled to send a transmission request requesting the transmission of the set of image data specified by the image data specific information to the mobile terminal by the first wireless communication and/or the image recording apparatus second communication unit is controlled to send the transmission request to the mobile terminal by the second wireless communication, the image recording unit is controlled to record, onto the recording medium, an image corresponding to the set of image data received by the image recording apparatus second communication unit from the mobile terminal in accordance with the transmission request, and the set of image data received by the image recording apparatus second communication unit and the image data specific information received by the image recording apparatus first communication unit is stored in the image recording apparatus storage unit in association with each other.

BRIEF DESCRIPTION OF THE DRAWINGS

Other and further objects, features and advantages of the invention will appear more fully from the following description taken in connection with the accompanying drawings in which:

FIG. 3A shows the data structure of print instruction information.

FIG. 3B shows image data information.

DESCRIPTION OF THE PREFERRED EMBODIMENTS

First Embodiment

The following will describe First Embodiment of the present invention with reference to figures.

Figure 1:
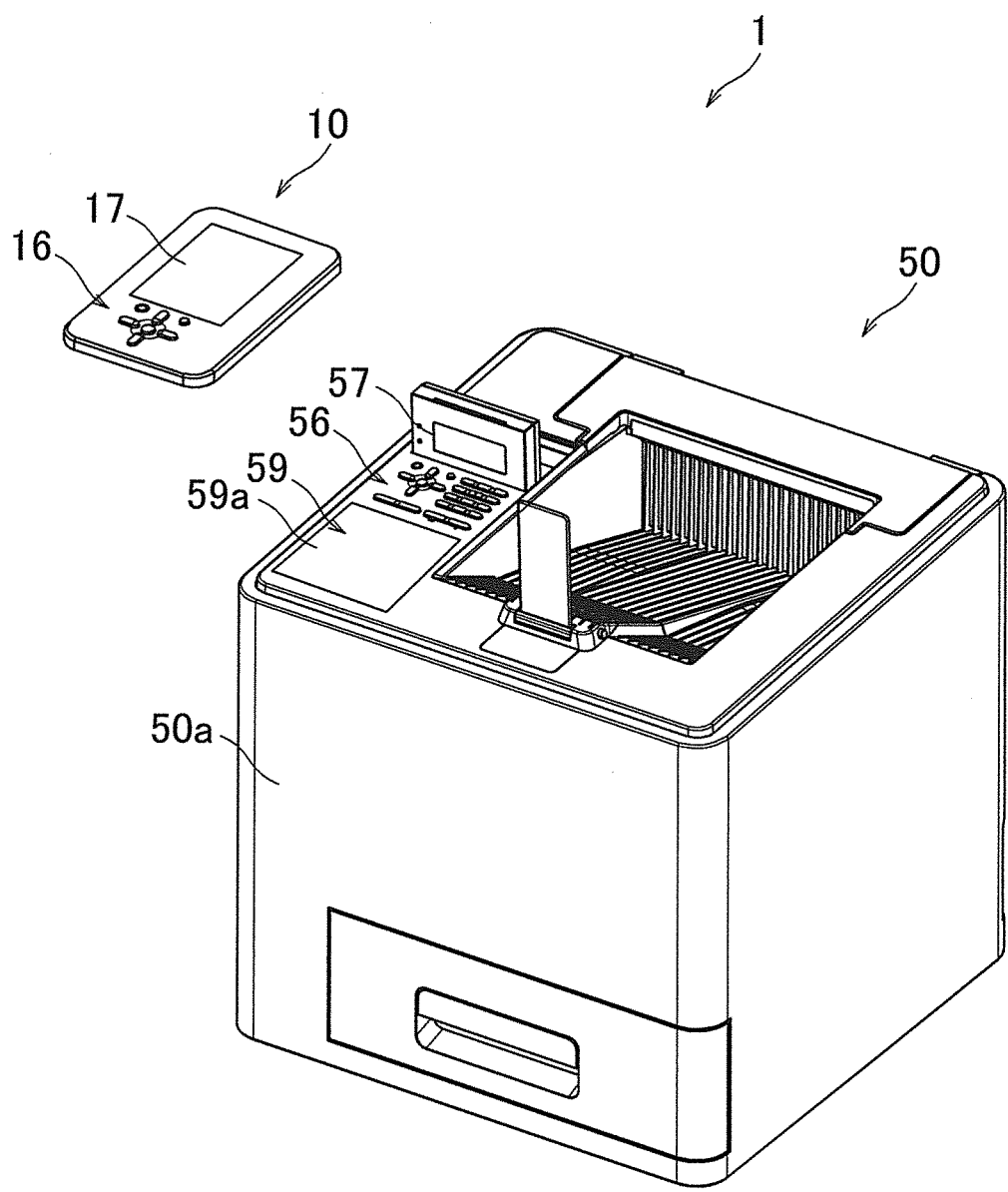
FIG. 1 is an exterior perspective view of an image recording system of First Embodiment.
Figure 2:
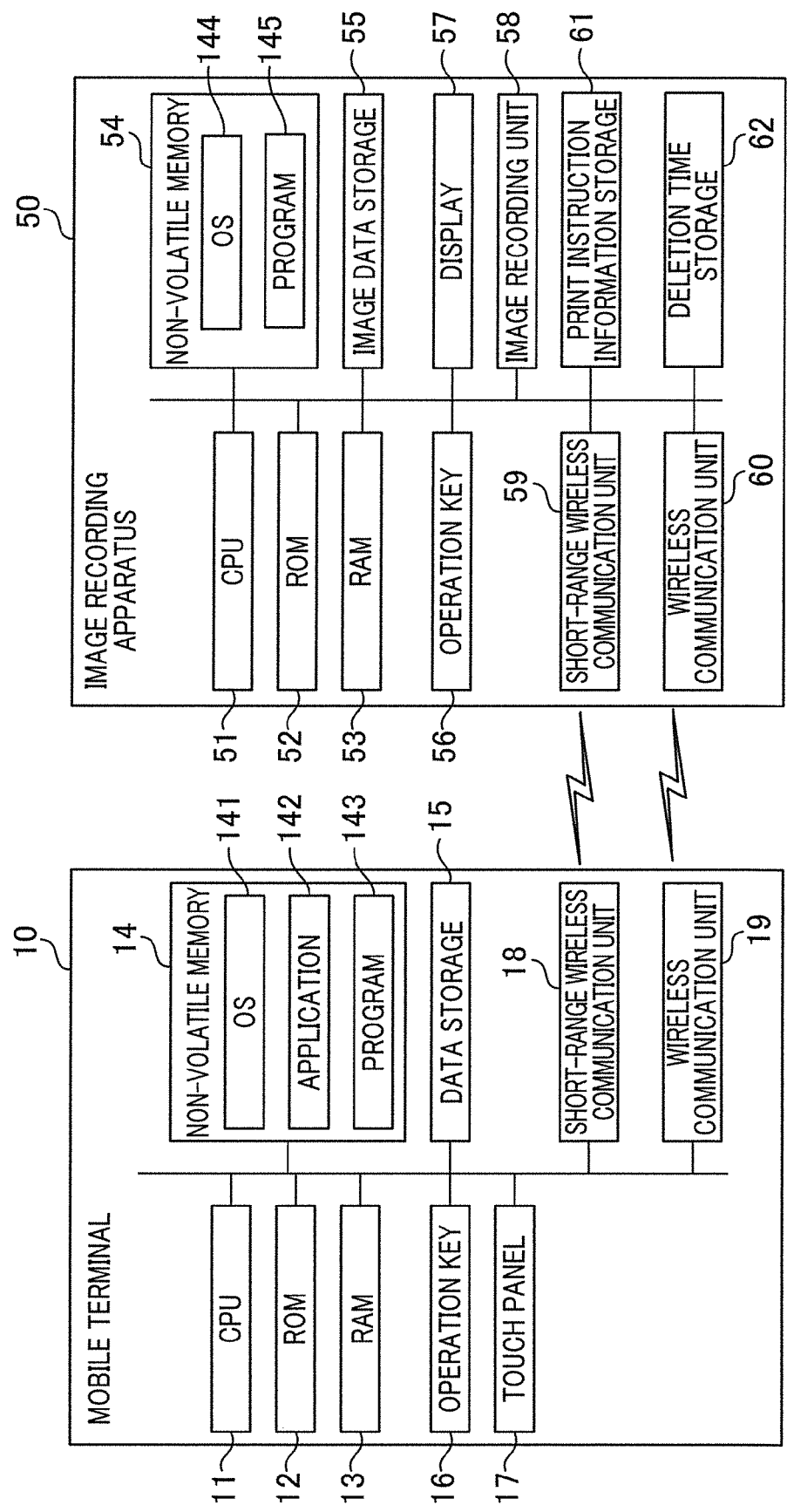
FIG. 2 is an electric configuration of the image recording system shown in FIG. 1.

To begin with, referring to FIG. 1 and FIG. 2, an image recording system 1 of the present embodiment will be described. The image recording system 1 includes a mobile terminal 10 and an image recording apparatus 50 configured to record an image on a recording medium (e.g., a paper sheet). The image recording system 1 of the present embodiment has a reprint function by which, after an image corresponding to a set of image data is recorded on a recording medium, the image corresponding to the same set of image data is re-printed on another recording medium. Furthermore, the image recording system 1 is capable of performing data communications between the mobile terminal 10 and the image recording apparatus 50 by two types of wireless communications, i.e., short-range wireless communication (first wireless communication) and wireless communication (second wireless communication).

The short-range wireless communication is communication in a very short range, e.g., about 10 cm. The communication is established when the mobile terminal 10 and the image recording apparatus 50 are in proximity to each other (or in contact with each other). Communication methods of the short-range wireless communication include NFC (Near Field Communication) based on international standards such as ISO/IEC21481 and ISO/IEC18092. In addition to the above, the short-range wireless communication is used for exchanging relatively small data because of its low transmission rate, as compared to the wireless communication (second wireless communication).

The wireless communication is, for example, local communication in a communication range of several meters to several tens of meters. The communication is established based on communication setting information which is exchanged between the mobile terminal 10 and the image recording apparatus 50 when the short-range wireless communication is established. An example of the wireless communication is wireless LAN in compliance with a standard such as IEEE (Institute of Electrical and Electronic Engineers) 802.11b/g. The wireless communication is used for exchanging relatively large data because of its high transmission rate as compared to the short-range wireless communication.

In cases of the short-range wireless communication, a communication counterpart is easily specified on account of the physical limitation of the communication distance, and therefore the communication setting for establishing the communication is easy as compared to the cases of the wireless communication. For example, in cases of the wireless communication, a user is required to specify with which device the communication is conducted, when there are a plurality of devices within the communication distance. On the other hand, in the short-range wireless communication the communication counterpart is basically specified to a single device because of the short communication distance. The user is required to bring his/her device close to a device which is the communication counterpart, and the communication counterpart is specified by this action.

In the image recording system 1 of the present embodiment, when the short-range wireless communication is established between the mobile terminal 10 and the image recording apparatus 50, communication setting information required to establish the wireless communication is sent from the mobile terminal 10 to the image recording apparatus 50 by means of the short-range wireless communication, and based this communication setting information, the wireless communication between the mobile terminal 10 and the image recording apparatus 50 is established (i.e., so-called handover is performed). This ensures the establishment of the wireless communication between the mobile terminal 10 and the image recording apparatus 50.

Now, the mobile terminal 10 will be detailed. The mobile terminal 10 is a mobile terminal such as a mobile phone or a PDA (Personal Digital Assistant), and includes, as shown in FIG. 2, a CPU (Central Processing Unit) 11 configured to run programs, a ROM (Read Only Memory) 12 configured to store programs or the like, a RAM (Random Access Memory) 13 used as a work area when the CPU 11 runs a program, a non-volatile memory 14, a data storage (mobile terminal data storage) 15, an operation key 16, a touch panel 17, a short-range wireless communication unit (mobile terminal first communication unit) 18, and a wireless communication unit (mobile terminal second communication unit) 19.

The non-volatile memory 14 stores an operating system (OS) 141, an application program 142 used for generating text data or the like, and various other control programs 143. The data storage 15 stores image data which is generated by an application activated as the CPU 11 runs the application program 142. In the present embodiment, the data storage 15 stores print instruction information, too. As shown in FIG. 3A, the print instruction information includes communication setting information and print setting information. The communication setting information is information required to establish the wireless communication, and includes, in the present embodiment, unique address information (e.g., IP address) of the mobile terminal 10, authorization information (such as path key), or the like. The print setting information includes image data specific information (e.g., ID information such as data name) for specifying a set of image data to be recorded by the image recording apparatus 50, user information indicating the user who owns the mobile terminal 10, and print condition information for setting print conditions in the image recording executed by the image recording apparatus 50, such as single/duplex printing and sheet size.

It is noted that the application program 142 and the control program 143 stored in the non-volatile memory 14 are installed from a removable storage or the like storing these programs. The removable storage is a non-temporary computer-readable medium. Examples of the removable storage include a CD-ROM (Compact Disc Read Only Memory), a Flexible Disc (FD), and Magneto Optical (MO).

The operation key 16 which is a mechanical key receives an instruction from the user and sends an electric signal corresponding to the instruction to the CPU 11. The touch panel 17 displays various images based on the control signal sent from the CPU 11, and receives an instruction from the user and outputs an electric signal corresponding to the instruction to the CPU 11.

The short-range wireless communication unit 18 is a communication circuit which establishes the short-range wireless communication with a later-described short-range wireless communication unit 59 for performing data communications with the image recording apparatus 50, when the distance to the short-range wireless communication unit 59 of the image recording apparatus 50 becomes shorter than the communication range of the short-range wireless communication. More specifically, the short-range wireless communication unit 18 is an interface enabling Near Field Communication (NFC) based on an international standard such as ISO/IEC21481 and ISO/IEC18092 or its equivalent.

The wireless communication unit 19 is a communication circuit for performing data communications with the image recording apparatus 50 in the wireless communication. More specifically, the wireless communication unit 19 is an interface which realizes wireless communication such as wireless LAN, based on the IEEE 802.11 standard or or its equivalent.

Now, the image recording apparatus 50 will be detailed. As shown in FIG. 1, the image recording apparatus 50 includes a rectangular parallelepiped housing 50*a*. Furthermore, as shown in FIG. 2, the image recording apparatus 50 includes a CPU 51 configured to run programs, a ROM 52 configured to store programs or the like, a RAM 53 used as a work area when the CPU 51 runs a program, a non-volatile memory 54, an image data storage (image recording apparatus storage unit) 55, an operation key 56, a display 57, an image recording unit image recording unit 58, a short-range wireless communication unit 59 (image recording apparatus first communication unit), a wireless communication unit (image recording apparatus second communication unit) 60, a print instruction information storage 61, and a deletion time storage 62. Furthermore, as shown in FIG. 1, the operation key 56, the display 57, and the short-range wireless communication unit 59 are provided at an upper part of the housing 50*a*.

The operation key 56 is an input device having operation buttons and is configured to output an electric signal based on an instruction from the user to the CPU 51. The display 57 is constituted by a small liquid crystal display or the like and is configured to display images based on a control signal supplied from the CPU 51. The image recording unit 58 has a printing mechanism such as an inkjet or laser printing mechanism, and records an image corresponding to image data onto a recording medium, in accordance with an instruction from the CPU 51.

The non-volatile memory 54 is a rewritable non-volatile memory and stores an operating system 144 and a control program 145.

It is noted that the control program 145 stored in the non-volatile memory 54 is installed from a removable storage or the like in which the program is stored. The removable storage is a non-temporary computer-readable medium. Examples of the removable storage include a CD-ROM (Compact Disc Read Only Memory), a Flexible Disc (FD), and Magneto Optical (MO).

The short-range wireless communication unit 59 is a communication circuit which is configured to establish the short-range wireless communication with the short-range wireless communication unit 18 for performing data communications with the mobile terminal 10, when the distance to the short-range wireless communication unit 18 of the mobile terminal 10 becomes shorter than the communication range of the short-range wireless communication. More specifically, the unit 59 is an interface enabling Near Field Communication (NFC) based on an international standard such as ISO/IEC21481 and ISO/IEC18092 or its equivalent.

The wireless communication unit 60 is a communication circuit for performing data communications with the mobile terminal 10 by the wireless communication. More specifically, the wireless communication unit 60 is an interface which realizes wireless communication such as wireless LAN, based on the IEEE 802.11 standard or or its equivalent. The print instruction information storage 61 temporarily stores print instruction information supplied from the mobile terminal 10. The deletion time storage 62 stores a deletion time which is used for deleting image data stored in the image data storage 55.

In consideration of re-printing, the image data storage 55 stores image data based on which the image recording unit 58 records an image on a recording medium and image data information concerning the image data, in association with one another. The image data information is information which includes, as shown in FIG. 3B, image data specific information and user information included in the print instruction information supplied from the short-range wireless communication unit 59 and a time at which the recording of the image onto the recording medium by the image recording unit 58 is completed (hereinafter, image recording completion time). The image data information is associated with each set of image data stored in the image data storage 55. In the present embodiment, the storage capacity of the image data storage 55 is arranged so that a plurality of sets of image data can be stored in the image data storage 55.

Now, the CPU 11 of the mobile terminal 10 will be detailed. Under the control of the OS 141, the CPU 11 (which is an example of a mobile terminal control unit) realizes the functions below, by executing an application program 142 and a control program 143 stored in the non-volatile memory 14.

Based on an electric signal input through the operation key 16 or the touch panel 17, the CPU 11 generates a set of image data on an application, and stores the generated image data in the data storage 15 in association with image data specific information by which the set of image data is specified.

Furthermore, based on an electric signal input through the operation key 16 or the touch panel 17, the CPU 11 controls the touch panel 17 so that an image corresponding to a set of image data among the sets of image data stored in the data storage 15 is displayed. Furthermore, the CPU 11 selects, from the sets of image data stored in the data storage 15, a set of image data which will be recorded by the image recording apparatus 50. In the present embodiment, the CPU 11 selects a set of image data corresponding to an image displayed on the touch panel 17, as a set of image data which will be recorded by the image recording apparatus 50. This allows the user to easily grasp a set of image data to be recorded by the image recording apparatus 50. As a variation, the CPU 11 may select a set of image data to be recorded by the image recording apparatus 50, based on an electric signal input through the operation key 16 or the touch panel 17. In the present embodiment, the CPU 11 is equivalent to a selection unit.

Based on an instruction from the user input through the operation key 16 or the touch panel 17, the CPU 11 generates print instruction information (see FIG. 3A) regarding the set of image data to be recorded by the image recording apparatus 50, and stores the generated print instruction information in the data storage 15.

The CPU 11 controls the short-range wireless communication unit 18 so that the data communications is performed with the image recording apparatus 50 based on the short-range wireless communication. More specifically, when the short-range wireless communication is established between the short-range wireless communication unit 18 of the mobile terminal 10 and the short-range wireless communication unit 59 of the image recording apparatus 50, the CPU 11 controls the short-range wireless communication unit 18 so that the print instruction information stored in the data storage 15 is sent to the image recording apparatus 50.

It is noted that, the establishment of the short-range wireless communication between the short-range wireless communication unit 18 of the mobile terminal 10 and the short-range wireless communication unit 59 of the image recording apparatus 50 indicates, for example, a state in which the CPU 11 of the mobile terminal 10 and the CPU 51 of the image recording apparatus 50 determine that mutual communications are possible between the short-range wireless communication unit 18 of the mobile terminal 10 and the short-range wireless communication unit 59 of the image recording apparatus 50. For example, when the image recording apparatus 50 is powered on, the CPU 51 of the image recording apparatus 50 causes the short-range wireless communication unit 59 to emit a detection wave to detect whether the mobile terminal 10 is in the short-range wireless communication range in which the establishment of the short-range wireless communication is possible. The detection wave includes information required to perform the short-range wireless communication (e.g., information regarding the communication standard and authorization information of the image recording apparatus 50). When the mobile terminal 10 enters the short-range wireless communication range of the image recording apparatus 50, the CPU 11 of the mobile terminal 10 receives, by the short-range wireless communication unit 18, the detection wave emitted from the short-range wireless communication unit 59 of the image recording apparatus 50, and sends a response wave to the image recording apparatus 50 by the short-range wireless communication unit 18 when it is determined based on the information in the received detection wave that the short-range wireless communication with the image recording apparatus 50 is possible. The response wave includes information such as information corresponding to the received detection wave (e.g., the authorization information of the image recording apparatus 50 and the authorization information of the mobile terminal 10). Receiving this response signal by the short-range wireless communication unit 59, the CPU 51 of the image recording apparatus 50 determines that the short-range wireless communication with the mobile terminal 10 is possible. The communication establishment method above may be realized by a known communication establishment technology.

In addition to the above, the CPU 11 controls the wireless communication unit 19 so that data communications with the image recording apparatus 50 are performed by the wireless communication. More specifically, receiving a later-described transmission request from the image recording apparatus 50, the CPU 11 controls the wireless communication unit 19 so that a selected set of image data among the sets of image data stored in the data storage 15 is sent to the image recording apparatus 50 by the wireless communication.

Now, the CPU 51 of the image recording apparatus 50 will be detailed. Under the control of the OS 144, the CPU 51 (which is an example of the image recording apparatus control unit) is able to realize the functions below, by executing the control program 145 stored in the non-volatile memory 54.

The CPU 51 controls the short-range wireless communication unit 59 so that data communications with the mobile terminal 10 are performed in the short-range wireless communication. Furthermore, when the short-range wireless communication is established between the short-range wireless communication unit 18 of the mobile terminal 10 and the short-range wireless communication unit 59 of the image recording apparatus 50, the CPU 51 temporarily stores, in the print instruction information storage 61, the print instruction information received by the short-range wireless communication unit 59.

The CPU 51 determines whether the image data storage 55 stores image data (hereinafter, related image data) associated with the image data information and the user information which correspond to the image data specific information and the user information included in the print instruction information stored in the print instruction information storage 61.

The CPU 51 controls the wireless communication unit 60 based on the communication setting information of the print instruction information stored in the print instruction information storage 61 so that the wireless communication with the mobile terminal 10 is established. More specifically, the CPU 51 controls the wireless communication unit 60 so that a connection request requesting the connection by the wireless communication is sent by the wireless communication to the mobile terminal 10 which is indicated by the address information of the communication setting information of the print instruction information. Thereafter, as a response to the connection request is sent from the mobile terminal 10 to the image recording apparatus 50, the wireless communication between the mobile terminal 10 and the image recording apparatus 50 is established.

In the meanwhile, when determining that the related image data is not stored in the image data storage 55, the CPU 51 controls the wireless communication unit 60 so that a transmission request requesting the transmission of a set of image data specified by the image data specific information is sent to the mobile terminal 10 by the wireless communication. The establishment of the wireless communication with the mobile terminal 10 indicates, for example, a state in which the CPU 11 of the mobile terminal 10 and the CPU 51 of the image recording apparatus 50 determine that mutual communications are possible between the wireless communication unit 19 of the mobile terminal 10 and the wireless communication unit 60 of the image recording apparatus 50. The wireless communication establishment method above may be realized by a known communication establishment technology.

The CPU 51 controls the image recording unit 58 so that an image corresponding to the set of image data supplied from the mobile terminal 10 is recorded onto the recording medium in accordance with the print condition information of the print instruction information stored in the print instruction information storage 61. More specifically, the CPU 51 controls the image recording unit 58 so that an image corresponding to the related image data stored in the image data storage 55 is recorded onto the recording medium, when it is determined that the related image data is stored in the image data storage 55.

On the other hand, when it is determined that the related image data is not stored in the image data storage 55, the CPU 51 controls the image recording unit 58 so that the image corresponding to the set of image data received by the wireless communication unit 60 onto the recording medium after controlling the wireless communication unit 60 to send the transmission request to the mobile terminal 10. Furthermore, the CPU 51 associates the received set of image data with the image data specific information and the user information of the print instruction information stored in the print instruction information storage 61 and with the image recording completion time, and stores them in the image data storage 55.

In addition to the above, based on an electric signal input through the operation key 16 or the touch panel 17, the CPU 51 sets the deletion time which indicates a time from the image recording completion time at which the recording onto the recording medium finishes to the deletion of the set of image data corresponding to the image having already recorded onto the recording medium from the image data storage 55, and stores this deletion time in the deletion time storage 62. This allows the user to set the time at which the image data is deleted from the image data storage 55. As a variation, the print instruction information may include information regarding the deletion time, and the CPU 51 may set the deletion time for each set of image data based on the information regarding the deletion time included in the print instruction information supplied from the mobile terminal 10. In the present embodiment, the operation key 16 and the touch panel 17 correspond to a time setting unit.

When, among the sets of image data stored in the image data storage 55, there is a set of image data with which the deletion time stored in the deletion time storage 62 has elapsed from the image recording completion time, the CPU 51 deletes that set of image data and the image data information associated with the set of image data from the image data storage 55. Therefore, because the set of image data stored in the image data storage 55 is deleted when the deletion time elapses from the image recording completion time, it is possible to restrain the possibility of the leakage of the image data to the outside.

In addition to the above, when the remaining storage capacity of the image data storage 55 becomes equal to or smaller than a predetermined threshold, the CPU 51 deletes a set of image data having the earliest image recording completion time and the image data information associated with that set of image data from the image data storage 55, among the sets of image data stored in the image data storage 55.

Figure 4:
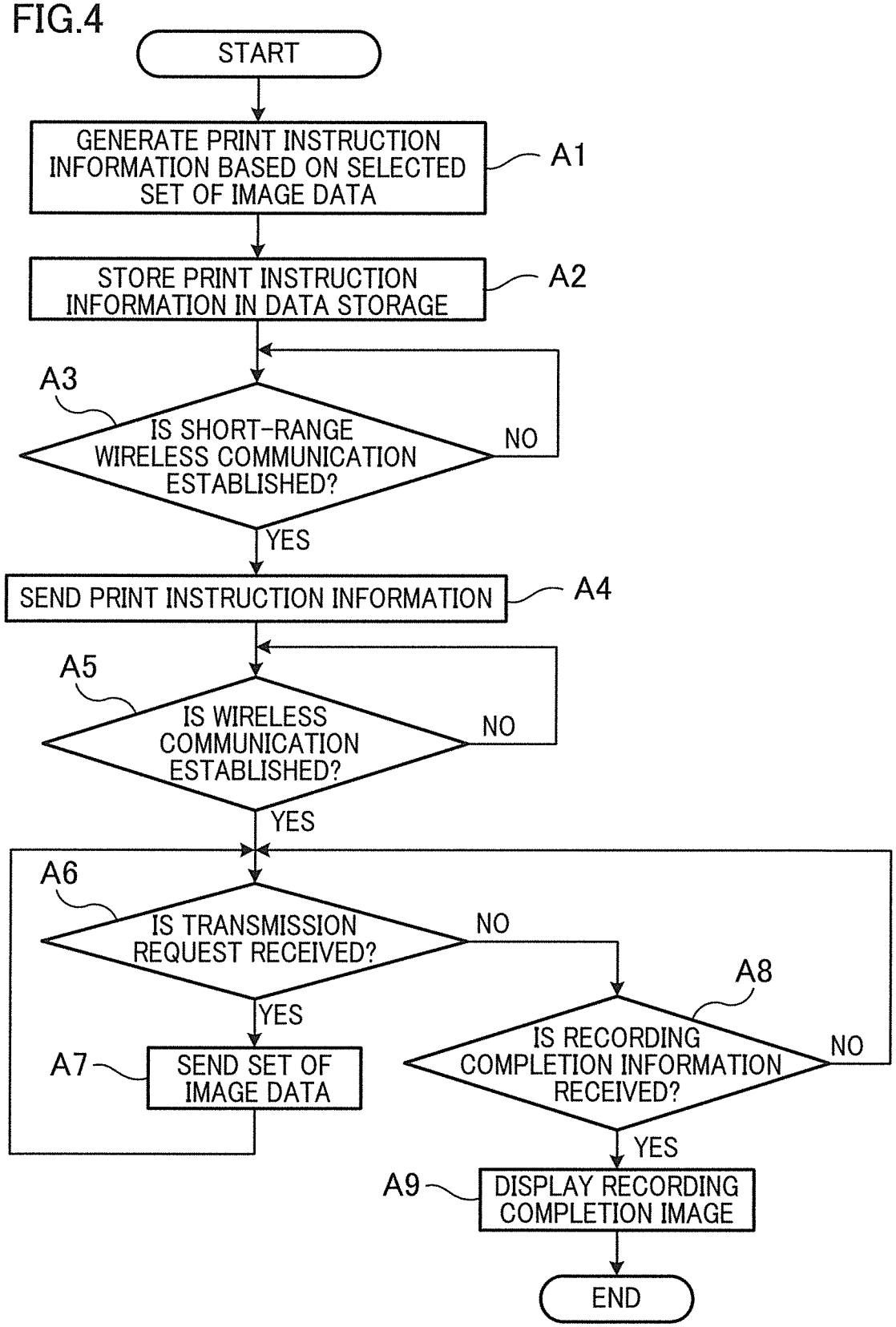
FIG. 4 is an operation flowchart of the mobile terminal shown in FIG. 1.

Now, the operation of the mobile terminal 10 will be described with reference to FIG. 4. It is noted that, at the start of the operation flow shown in FIG. 4, the distance between the short-range wireless communication unit 18 of the mobile terminal 10 and the short-range wireless communication unit 59 of the image recording apparatus 50 is longer than the communication range of the short-range wireless communication.

To begin with, the CPU 11 selects a set of image data corresponding to an image displayed on the touch panel 17 as the set of image data to be recorded by the image recording apparatus 50, and generates print instruction information regarding the selected set of image data (A1). Then the CPU 11 stores the generated print instruction information in the data storage 15 of the mobile terminal 10 (A2).

Subsequently, when the user brings the mobile terminal 10 and the image recording apparatus 50 into the communication range of the short-range wireless communication and hence the short-range wireless communication between the mobile terminal 10 and the image recording apparatus 50 is established (A3: YES), the CPU 11 controls the short-range wireless communication unit 18 so that the print instruction information stored in the data storage 15 is sent to the image recording apparatus 50 (A4). As a result, the communication setting information is sent from the mobile terminal 10 to the image recording apparatus 50, and hence the establishment of the wireless communication between the mobile terminal 10 and the image recording apparatus 50 becomes possible.

Subsequently, the CPU 11 determines whether the wireless communication is established between the mobile terminal 10 and the image recording apparatus 50 (A5). When it is determined that the wireless communication is not established (A5: NO), the step A5 is repeatedly executed until the wireless communication is established. On the other hand, when the wireless communication is established (A5: YES), the CPU 11 determines whether the transmission request from the image recording apparatus 50 is received by the wireless communication unit 19 (A6). When it is determined that the transmission request from the image recording apparatus 50 is received (A6: YES), the CPU 11 controls the wireless communication unit 19 so that the selected set of image data among the sets of image data stored in the data storage 15 is sent to the image recording apparatus 50 by the wireless communication (A7). After the completion of the step A7, the process goes back to the step A6.

In the step A6, when the CPU 11 determines that the transmission request from the image recording apparatus 50 is not received by the wireless communication unit 19 (A6: NO), the CPU 11 determines whether recording completion information from the image recording apparatus 50 is received by the wireless communication unit 19 (A8). In this connection, the recording completion information is information indicating that, in the image recording apparatus 50, recording of an image corresponding to a set of image data specified by the image data specific information in the print instruction information sent to the image recording apparatus 50 onto a recording medium has been completed. When it is determined that the recording completion information from the image recording apparatus 50 is not received (A8: NO), the process goes back to the step A6. On the other hand, when it is determined that the recording completion information is received from the image recording apparatus 50 (A8: YES), the CPU 11 controls the touch panel 17 so that an image indicating that the image recording onto the recording medium is completed is displayed (A9), and the process is terminated. The mobile terminal 10 operates as described above.

Figure 5:
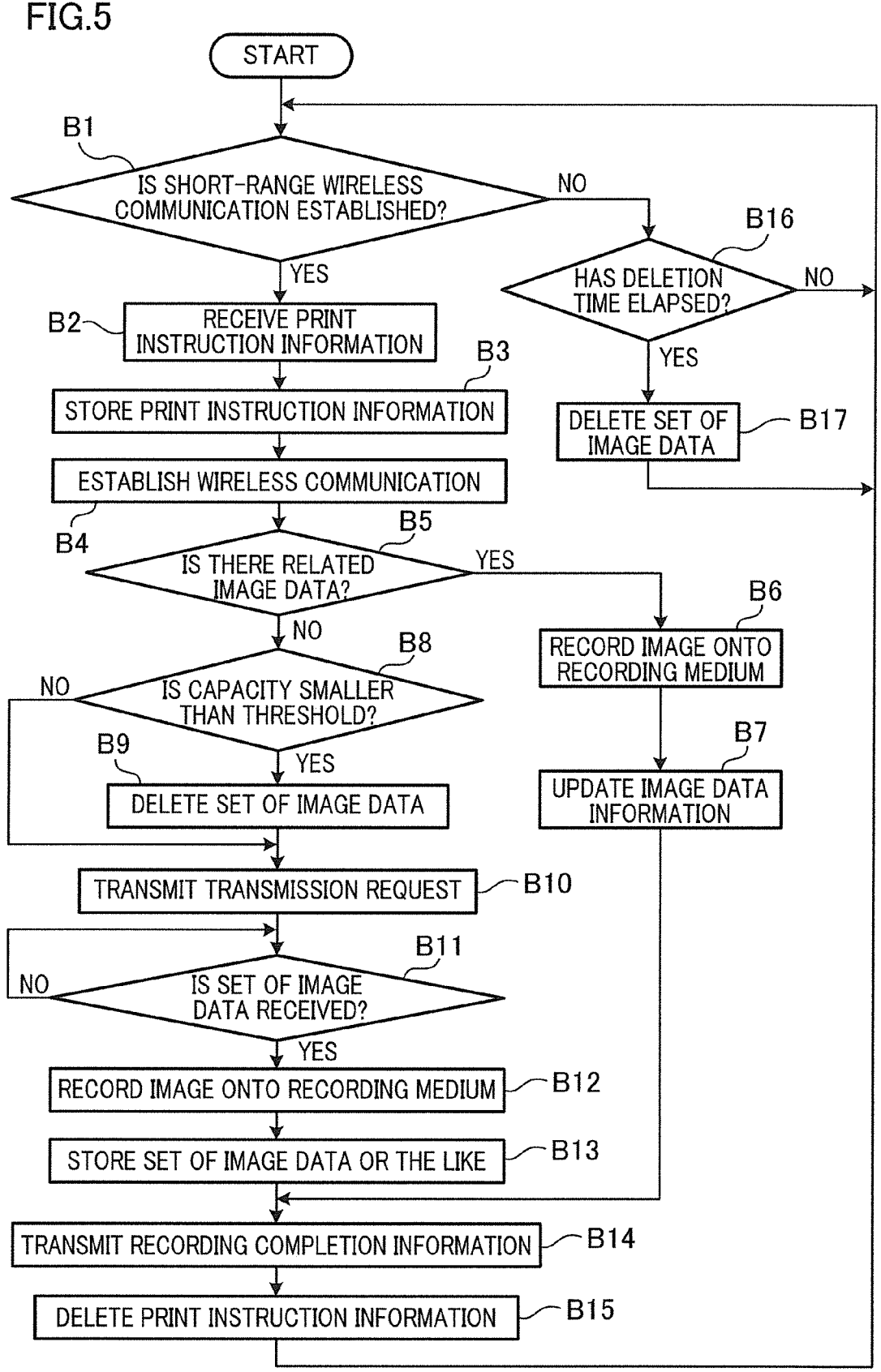
FIG. 5 is an operation flowchart of the image recording apparatus shown in FIG. 1.

Now, the operation of the image recording apparatus 50 will be described with reference to FIG. 5. It is noted that, at the start of the operation flow shown in FIG. 5, the distance between the short-range wireless communication unit 18 of the mobile terminal 10 and the short-range wireless communication unit 59 of the image recording apparatus 50 is longer than the communication range of the short-range wireless communication.

To begin with, the CPU 51 determines whether the short-range wireless communication is established between the short-range wireless communication unit 18 of the mobile terminal 10 and the short-range wireless communication unit 59 of the image recording apparatus 50 (B1). When it is determined that the short-range wireless communication is established (B1: YES), the CPU 51 receives the print instruction information from the mobile terminal 10 by using the short-range wireless communication unit 59 and by the short-range wireless communication (B2), and stores the print instruction information in the print instruction information storage 61 (B3). Subsequently, the CPU 51 extracts the communication setting information from the print instruction information stored in the print instruction information storage 61, and based on this communication setting information, controls the wireless communication unit 60 so that the wireless communication is established between the mobile terminal 10 and the image recording apparatus 50 (B4).

Subsequently, the CPU 51 determines whether the image data storage 55 stores the related image data associated with the image data information and the user information corresponding to the image data specific information and the user information included in the print instruction information stored in the print instruction information storage 61(B5).

When it is determined that the image data storage 55 stores the related image data (B5: YES), the CPU 51 controls the image recording unit 58 so that an image corresponding to the related image data is recorded on a recording medium in accordance with the print condition information stored in the print instruction information storage 61 (B6). Thereafter, the CPU 51 sets the time at which the image recording onto the recording medium in the step B6 is completed as the image recording completion time of the image data information corresponding to the related image data stored in the image data storage 55 (B7), and the process proceeds to the step B14.

On the other hand, when it is determined that the image data storage 55 does not store the related image data (B5: NO), the CPU 51 determines whether the remaining storage capacity of the image data storage 55 is larger than the predetermined threshold (B8). When it is determined that the remaining storage capacity is larger than the predetermined threshold (B8: NO), the process proceeds to the step B10. On the other hand, when the remaining storage capacity is not larger than the predetermined threshold (B8: YES), with reference to the image data information stored in the image data storage 55, the CPU 51 deletes, from the image data storage 55, a set of image data having the earliest image recording completion time among the sets of image data stored in the image data storage 55, and also the image data information associated with this set of image data (B9). This allows a newly-received set of image data from the mobile terminal 10 to be certainly stored in the image data storage 55. After this step B9, the process proceeds to the step B10.

In the step B10, the CPU 51 controls the wireless communication unit 60 so that the transmission request is sent to a mobile terminal 10 indicated by the address information in the communication setting information of the print instruction information stored in the print instruction information storage 61. Subsequently, the CPU 51 determines whether the set of image data sent from the mobile terminal 10 in response to the transmitted transmission request is received by the wireless communication unit 60 (B11). When it is determined that the set of image data is not received (B11: NO), the step B11 is repeatedly executed until the wireless communication unit 60 receives the image data. On the other hand, when the set of image data is received (B11: YES), the CPU 51 controls the image recording unit 58 so that an image corresponding to the received set of image data is recorded onto a recording medium in accordance with the print condition information stored in the print instruction information storage 61 (B12). Thereafter, the CPU 51 associates the received set of image data with the image data specific information and the user information stored in the print instruction information storage 61 and stores the data in the image recording apparatus 50 (B13). At the same time, the CPU 51 sets the time at which the image recording onto the recording medium in the step B12 is completed as the image recording completion time, associates the time with the image data, and stores the time. After the step B13, the process proceeds to the step B14.

In the step B14, the CPU 51 controls the wireless communication unit 60 so that the recording completion information is sent to a mobile terminal 10 indicated by the address information of the communication setting information stored in the print instruction information storage 61. Thereafter, the CPU 51 deletes the print instruction information from the print instruction information storage 61 (B15), and the process goes back to the step B1.

When it is determined in the step B1 that the short-range wireless communication is not established between the short-range wireless communication unit 18 of the mobile terminal 10 and the short-range wireless communication unit 59 of the image recording apparatus 50 (B1: NO), the CPU 51 determines whether the sets of image data stored in the image data storage 55 include a set of image data with which the deletion time stored in the deletion time storage 62 has elapsed from the image recording completion time (B16). When there is no set of image data with which the deletion time has elapsed from the image recording completion time (B16: NO), the process goes back to the step B1. On the other hand, when there is a set of image data with which the deletion time has elapsed from the image recording completion time (B16: YES), the CPU 51 deletes the set of image data and the image data information associated with this set of image data from the image data storage 55 (B17), and the process goes back to the step B1. The image recording apparatus 50 operates as described above.

Figure 6:
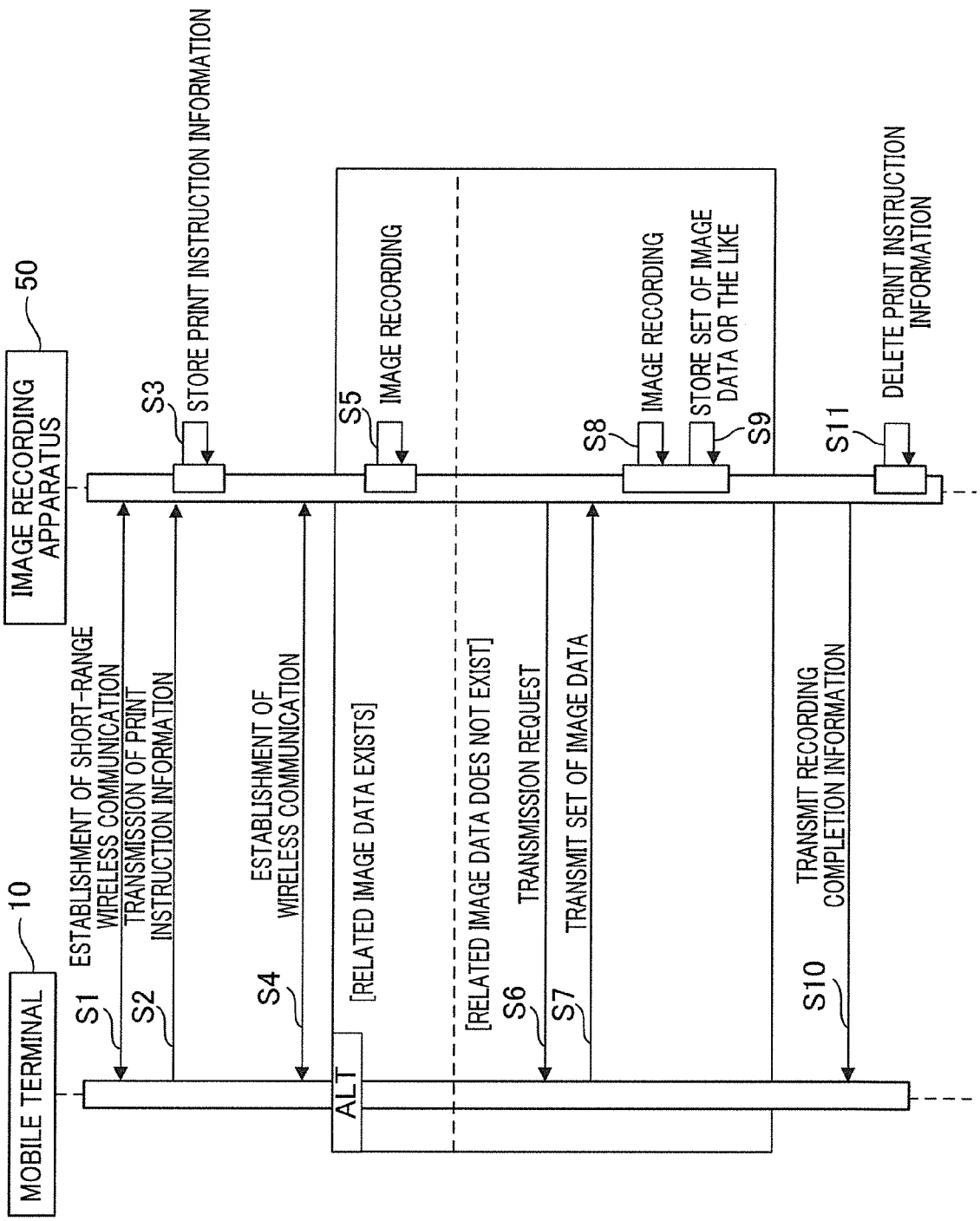
FIG. 6 is a sequence diagram showing a procedure of data communications between the mobile terminal and the image recording apparatus.

Now, referring to FIG. 6, the data communications procedure between the mobile terminal 10 and the image recording apparatus 50 will be described. As shown in FIG. 6, when the short-range wireless communication is established as the user moves the mobile terminal 10 close to the image recording apparatus 50 (S1), the mobile terminal 10 sends the print instruction information to the image recording apparatus 50 by the short-range wireless communication (S2). Receiving the print instruction information, the image recording apparatus 50 stores the print instruction information in the print instruction information storage 61 (S3). Thereafter, by using the communication setting information transmitted between the mobile terminal 10 and the image recording apparatus 50, the wireless communication is established between the mobile terminal 10 and the image recording apparatus 50 (S4).

Thereafter, when, in the image recording apparatus 50, the image data storage 55 stores the related image data associated with the image data information and the user information corresponding to the image data specific information and the user information included in the print instruction information stored in the print instruction information storage 61, the image recording apparatus 50 records an image corresponding to the related image data onto a recording medium in accordance with the print condition information stored in the print instruction information storage 61 (S5). After this step S5, the process proceeds to the step S10.

On the other hand, when in the image recording apparatus 50 the related image data is not stored in the image data storage 55, the image recording apparatus 50 sends the transmission request to the mobile terminal 10 by the wireless communication (S6). Receiving the transmission request, the mobile terminal 10 sends the selected set of image data among the sets of image data stored in the data storage 15 to the image recording apparatus 50 by the wireless communication (S7). Thereafter, the image recording apparatus 50 having received the set of image data records an image corresponding to the received image data onto a recording medium, in accordance with the print condition information stored in the print instruction information storage 61 (S8). Then the image recording apparatus 50 associates the received set of image data with the image data specific information and the user information stored in the print instruction information storage 61, and stores the data in the image recording apparatus 50 (S9). After the step S9, the process proceeds to the step S10.

In the step S10, the image recording apparatus 50 sends the recording completion information to the mobile terminal 10. Thereafter, the image recording apparatus 50 deletes the print instruction information from the print instruction information storage 61 (S11). The data communications procedure between the mobile terminal 10 and the image recording apparatus 50 is executed as described above.

In the present embodiment, when the short-range wireless communication is established between the mobile terminal 10 and the image recording apparatus 50, an image corresponding to the set of image data stored in the data storage 15 of the mobile terminal 10 is recorded onto a recording medium at the image recording apparatus 50. At this stage, when the set of image data stored in the data storage 15 of the mobile terminal 10 is stored in the image data storage 55, no image data is transmitted between the mobile terminal 10 and the image recording apparatus 50 and the image is recorded onto the recording medium by using the set of image data stored in the image data storage 55. This reduces the burden of the communications process between the mobile terminal 10 and the image recording apparatus 50.

In addition to the above, in the present embodiment, because the image data storage 55 stores not only the image data specific information but also the user information in association with the set of image data, it is possible to precisely record an image corresponding to the set of image data onto a recording medium in the image recording apparatus 50, even if the short-range wireless communication is alternately established between the image recording apparatus 50 and different mobile terminals 10 of different users.

According to the present embodiment, because a set of image data corresponding to an image displayed on the touch panel 17 of the mobile terminal 10 is selected as a set of image data to be recorded by the image recording apparatus 50, the user is able to easily select a set of image data to be recorded by the image recording apparatus 50.

Second Embodiment

Now, Second Embodiment of the present invention will be described with reference to FIG. 7 to FIG. 10. Second Embodiment is different from First Embodiment in that, while in First Embodiment mutual communications between the short-range wireless communication unit of the mobile terminal and the short-range wireless communication unit of the image recording apparatus are possible in peer to peer, in Second Embodiment a short-range wireless communication unit of a mobile terminal has a tag and a short-range wireless communication unit of an image recording apparatus is constructed as a reader/writer. In Second Embodiment, furthermore, from the image recording apparatus to the mobile terminal, communication setting information regarding the image recording apparatus is sent by the short-range wireless communication. In addition to the above, the transmission of a transmission request from the image recording apparatus to the mobile terminal is executed by the short-range wireless communication. Moreover, in Second Embodiment, the deletion of a set of image data stored in the image data storage of the image recording apparatus is executed when the set of image data corresponding to the image displayed on the touch panel of the mobile terminal is changed. Moreover, an image indicating that the recording of an image on a recording medium is completed is displayed on a display of the image recording apparatus. In Second Embodiment, furthermore, the image recording apparatus does not include a deletion time storage. In the present embodiment, members identical with those in the embodiment above will be denoted by the same reference numerals and the descriptions thereof will be suitably omitted.

Figure 7:
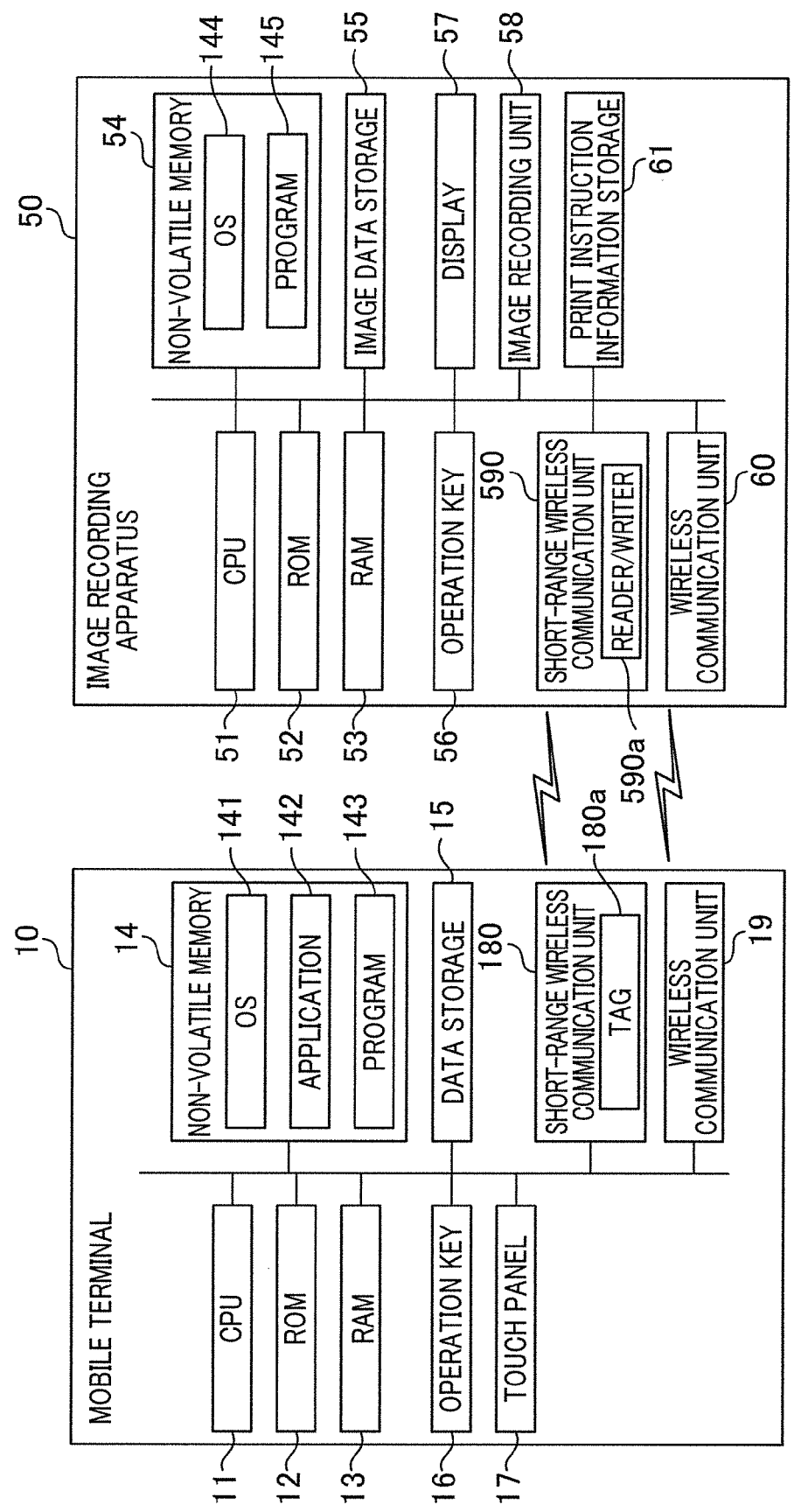
FIG. 7 shows the electric configuration of an image recording system of Second Embodiment.

As shown in FIG. 7, a short-range wireless communication unit 180 of a mobile terminal 10 is an IC chip including a tag 180a storing data to be sent to an image recording apparatus 50 and a communication control program (not illustrated) used for controlling the establishment of the short-range wireless communication and data transmission. The tag 180a stores print instruction information. In the present embodiment, the print instruction information does not include communication setting information regarding the mobile terminal 10.

Furthermore, a short-range wireless communication unit 590 of the image recording apparatus 50 includes a reader/writer 590a which has a communication control program by which data stored in the tag 180a of the short-range wireless communication unit 180 of the mobile terminal 10 is read in a non-contact manner when the short-range wireless communication with the mobile terminal 10 is established. Therefore, when the short-range wireless communication is established between the mobile terminal 10 and the image recording apparatus 50, the reader/writer 590a of the image recording apparatus 50 reads the data from the tag 180a of the mobile terminal 10, and hence the print instruction information is sent to the image recording apparatus 50. Furthermore, when the short-range wireless communication is established between the mobile terminal 10 and the image recording apparatus 50, the reader/writer 590a of the image recording apparatus 50 writes the communication setting information regarding the image recording apparatus 50 into the tag 180a, with the result that the communication setting information regarding the image recording apparatus 50 is sent to the mobile terminal 10. In the present embodiment, the CPU 11 and the short-range wireless communication unit 180 constitute a mobile terminal control unit. Furthermore, the CPU 51 and the short-range wireless communication unit 590 constitute an image recording apparatus control unit.

In addition to the above, in the present embodiment, the CPU 11 of the mobile terminal 10 controls the wireless communication unit 19 so that the wireless communication with the image recording apparatus 50 is established when the communication setting information is supplied from the image recording apparatus 50 by the short-range wireless communication. More specifically, the CPU 11 controls the wireless communication unit 19 so that a connection request requesting the connection is sent by the wireless communication to the image recording apparatus 50 indicated by the address information of the communication setting information. Thereafter, as a response to the connection request is sent from the image recording apparatus 50 to the mobile terminal 10, the wireless communication is established between the mobile terminal 10 and the image recording apparatus 50.

In addition to the above, the CPU 11 controls the wireless communication unit 19 so that a deletion instruction is sent to the image recording apparatus 50 when the set of image data corresponding to the image displayed on the touch panel 17 is changed.

When determining that no related image data is stored in the image data storage 55, the CPU 51 of the image recording apparatus 50 controls the short-range wireless communication unit 59 so that the transmission request concerning the related image data is sent to the mobile terminal 10 by the short-range wireless communication. Being similar to the communication setting information concerning the image recording apparatus 50, this transmission request is also sent from the image recording apparatus 50 to the mobile terminal 10 as the reader/writer 590a writes the transmission request into the tag 180a.

When the wireless communication unit 60 receives the deletion instruction from the mobile terminal 10, the CPU 51 deletes the image data and the image data information stored in the image data storage 55. In the present embodiment, the image data storage 55 is arranged to be able to store only one set of image data.

Figure 8:
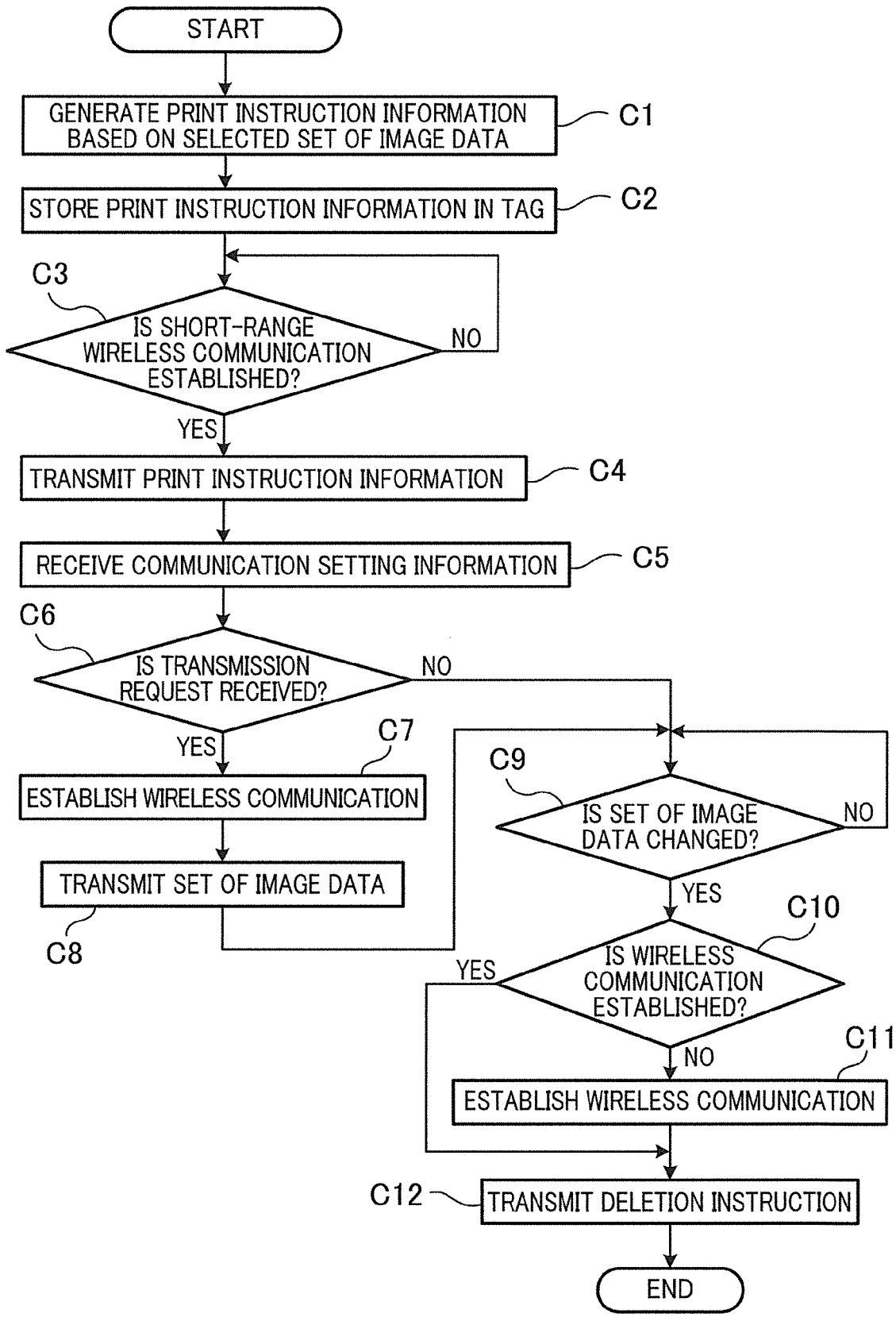
FIG. 8 is an operation flowchart of the mobile terminal of Second Embodiment.

Now, the operation of the mobile terminal 10 of the present embodiment will be described with reference to FIG. 8. To begin with, the CPU 11 selects a set of image data corresponding to an image displayed on the touch panel 17 as a set of image data to be recorded by the image recording apparatus 50, and generates print instruction information concerning the selected set of image data (C1). Thereafter, the CPU 11 stores the generated print instruction information in the tag 180a of the short-range wireless communication unit 180 (C2).

Subsequently, as the user moves the mobile terminal 10 close to the image recording apparatus 50 and hence the short-range wireless communication is established between the mobile terminal 10 and the image recording apparatus 50 (C3: YES), the data stored in the tag 180a of the short-range wireless communication unit 180 of the mobile terminal 10 is read by the reader/writer 590a of the short-range wireless communication unit 59 of the image recording apparatus 50, with the result that the print instruction information is sent from the mobile terminal 10 to the image recording apparatus 50 (C4). At this stage, furthermore, the reader/writer 590a of the short-range wireless communication unit 59 of the image recording apparatus 50 writes the communication setting information concerning the image recording apparatus 50 into the tag 180a. As a result of this, the CPU 11 receives the communication setting information sent from the image recording apparatus 50 via the short-range wireless communication unit 180. Consequently, the wireless communication can be established between the mobile terminal 10 and the image recording apparatus 50.

Subsequently, the CPU 11 determines whether the short-range wireless communication unit 180 receives the transmission request from the image recording apparatus 50 by the short-range wireless communication (C6). When it is determined that the transmission request is not supplied from the image recording apparatus 50 (C6: NO), the process goes back to the step C9. On the other hand, when the transmission request is supplied from the image recording apparatus 50 (C6: YES), the CPU 11 controls the wireless communication unit 19 so that the wireless communication is established between the mobile terminal 10 and the image recording apparatus 50 based on the communication setting information having been received in the step C5 (C7). Subsequently, the CPU 11 controls the wireless communication unit 19 so that, among the sets of image data stored in the data storage 15, a set of image data corresponding to an image displayed on the touch panel 17 is sent to the image recording apparatus 50 by the wireless communication (C8). After this step C8, the process proceeds to the step C9.

In the step C9, the CPU 11 determines whether the set of image data corresponding to the image displayed on the touch panel 17 has been changed from the set of image data corresponding to the image which was displayed on the touch panel 17 when the CPU 11 generated the print instruction information in the step C1. When the set of image data is unchanged (C9: NO), the step C9 is repeated.

On the other hand, when the set of image data has been changed (C9: YES), the CPU 11 determines whether the wireless communication is established between the image recording apparatus 50 and the mobile terminal 10 (C10). When it is determined that the wireless communication is established (C10: YES), the process proceeds to the step C12. On the other hand, when the wireless communication is not established (C10: NO), based on the communication setting information received in the step C5, the CPU 11 controls the wireless communication unit 19 so that the wireless communication is established between the mobile terminal 10 and the image recording apparatus 50 (C11). After the step C11, the process proceeds to the step C12.

In the step C12, the CPU 11 controls the wireless communication unit 19 so that the deletion instruction is sent to the image recording apparatus 50 by the wireless communication. The process is terminated after the completion of the step C12. The mobile terminal 10 operates as described above.

Figure 9:
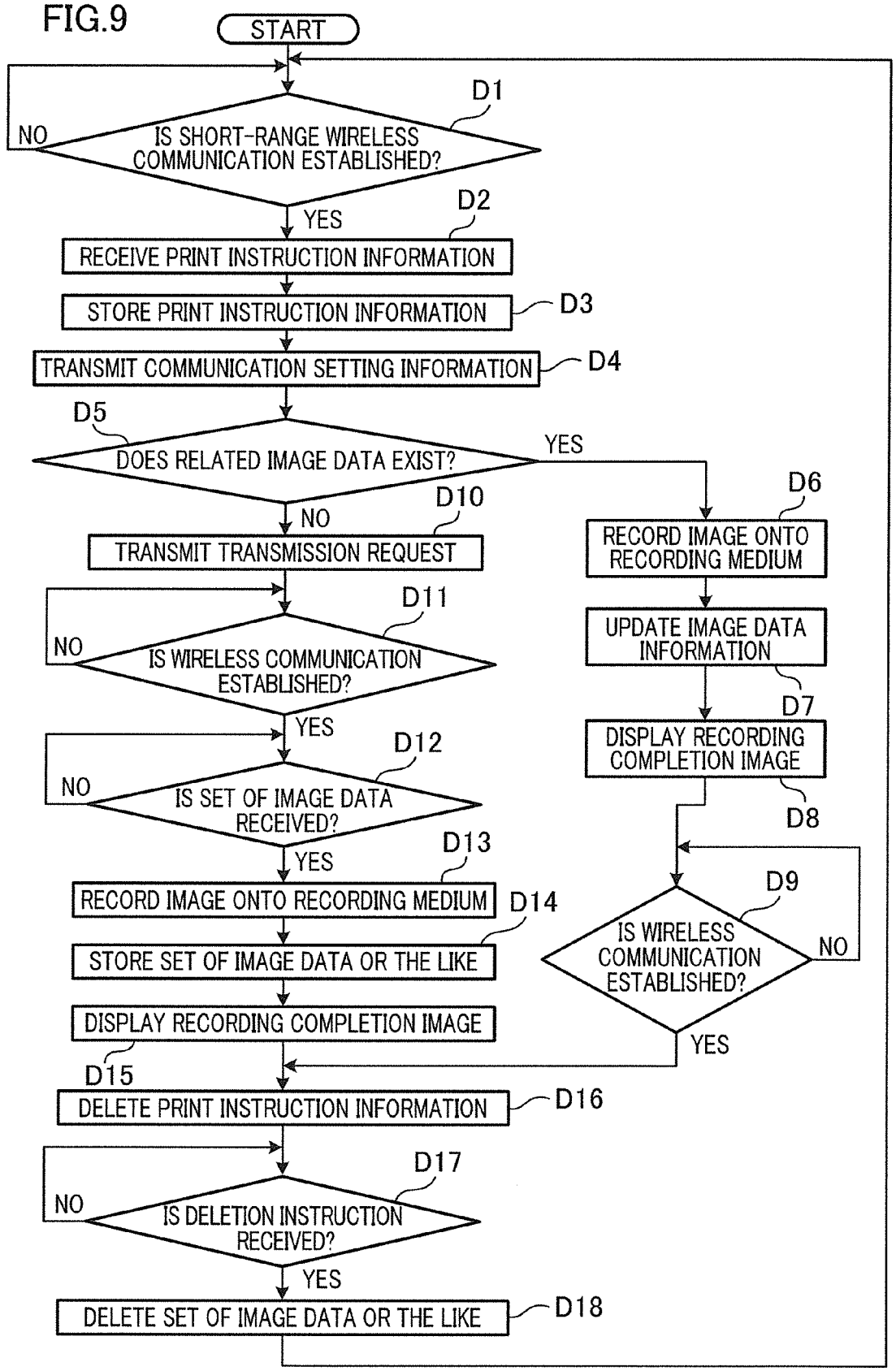
FIG. 9 is an operation flowchart of the image recording apparatus of Second Embodiment.

Now, the operation of the image recording apparatus 50 will be described with reference to FIG. 9. To begin with, when the short-range wireless communication is established between the short-range wireless communication unit 180 of the mobile terminal 10 and the short-range wireless communication unit 590 of the image recording apparatus 50 (D1: YES), the CPU 51 receives the print instruction information from the mobile terminal 10 via the short-range wireless communication unit 590 (D2), and stores the print instruction information in the print instruction information storage 61 (D3). Furthermore, by writing the communication setting information including the address information which is unique information of the image recording apparatus 50 into the tag 180a of the mobile terminal 10, the reader/writer 590a sends the communication setting information to the mobile terminal 10 by the short-range wireless communication (D4).

Subsequently, the CPU 51 determines whether the image data storage 55 stores related image data associated with the user information and the image data information corresponding to the image data specific information and the user information included in the print instruction information stored in the print instruction information storage 61 (D5). When it is determined that the image data storage 55 stores the related image data (D5: YES), the process proceeds to the step D6. The steps D6 and D7 are not described here because they are substantially identical with the steps B6 and B7 described above. After the step D7, the CPU 51 controls the display 57 so that an image indicating that the recording of the image onto the recording medium is completed is displayed (D8). Subsequently, the CPU 51 determines whether the wireless communication is established between the mobile terminal 10 and the image recording apparatus 50 (D9). When it is determined that the wireless communication is not established (D9: NO), the step D9 is repeatedly executed until the wireless communication is established. On the other hand, when the wireless communication is established (D9: YES), the process proceeds to the step D16.

In the step D5, when it is determined that the image data storage 55 does not store the related image data (D5: NO), the CPU 51 controls the short-range wireless communication unit 590 so that the transmission request is sent to the mobile terminal 10 (D10).

Subsequently, the CPU 51 determines whether the wireless communication is established between the mobile terminal 10 and the image recording apparatus 50 (D11). When it is determined that the wireless communication is not established (D11: NO), the step D11 is repeatedly executed until the wireless communication is established. On the other hand, when the wireless communication is established (D11: YES), the CPU 51 determines whether the set of image data which is sent from the mobile terminal 10 in accordance with the transmitted transmission request is received by the wireless communication unit 60 (D12). When it is determined that the set of image data is not received (D12: NO), the step D12 is repeatedly executed until the wireless communication unit 60 receives the set of image data. On the other hand, when the set of image data is received (D12: YES), the process proceeds to the step D13. The steps D13 and D14 are not explained here because they are substantially identical with the steps B12 and B13 above. After the step D14, the CPU 51 controls the display 57 so that an image indicating the completion of the recording of the image onto the recording medium (D15) is displayed, and the process proceeds to the step D16.

In the step D16, the CPU 51 deletes the print instruction information from the print instruction information storage 61. Subsequently, the CPU 51 determines whether the wireless communication unit 60 receives a deletion instruction from the mobile terminal 10 (D17). When it is determined that the deletion instruction is not received (D17: NO), the step D17 is repeatedly executed. On the other hand, when the deletion instruction is received (D17: YES), the CPU 51 deletes the set of image data and the image data information associated with the set of image data from the image data storage 55 (D18), and the process goes back to the step D1. The image recording apparatus 50 operates as described above.

Figure 10:
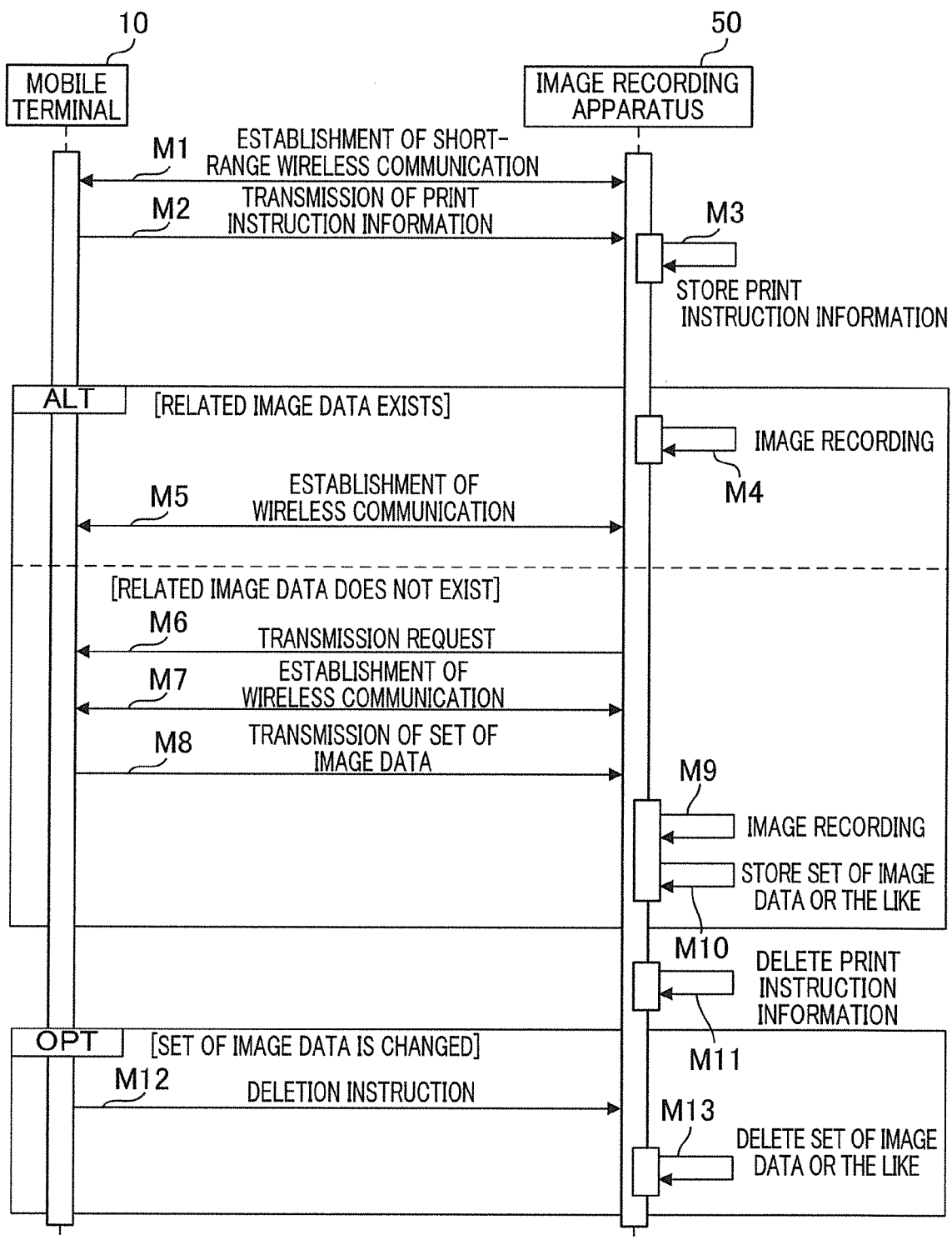
FIG. 10 is a sequence diagram showing a procedure of data communications between the mobile terminal and the image recording apparatus of Second Embodiment.

Now, referring to FIG. 10, the data communications procedure between the mobile terminal 10 and the image recording apparatus 50 will be described. The steps M1 to M3 are not explained here because they are substantially identical with the steps S1 to S3 above.

After the step M3, when in the image recording apparatus 50 the image data storage 55 stores the related image data associated with the user information and the image data information corresponding to the image data specific information and the user information included in the print instruction information stored in the print instruction information storage 61, the image recording apparatus 50 records an image corresponding to the related image data onto a recording medium in accordance with the print condition information stored in the print instruction information storage 61 (M4). Thereafter, by using the communication setting information transmitted between the mobile terminal 10 and the image recording apparatus 50, the wireless communication is established between the mobile terminal 10 and the image recording apparatus 50 (M5). After this step M5, the process proceeds to the step M11.

On the other hand, when in the image recording apparatus 50 the related image data is not stored in the image data storage 55, the image recording apparatus 50 sends the transmission request to the mobile terminal 10 by the short-range wireless communication (M6). Thereafter, by using the communication setting information transmitted between the mobile terminal 10 and the image recording apparatus 50, the wireless communication is established between the mobile terminal 10 and the image recording apparatus 50 (M7). Receiving the transmission request, the mobile terminal 10 sends a set of image data corresponding to an image displayed on the touch panel 17 among the sets of image data stored in the data storage 15 to the image recording apparatus 50 by the wireless communication (M8).

Thereafter, the image recording apparatus 50 having received the set of image data records the image corresponding to the received set of image data onto the recording medium, in accordance with the print condition information stored in the print instruction information storage 61 (M9). Then the image recording apparatus 50 associates the received set of image data with the image data specific information and the user information stored in the print instruction information storage 61 and stores the data in the image recording apparatus 50 (M10). After this step M10, the process proceeds to the step M11.

In the step M11, the image recording apparatus 50 deletes the print instruction information from the print instruction information storage 61. Thereafter, when the set of image data corresponding to the image displayed on the touch panel 17 of the mobile terminal 10 is changed, the mobile terminal 10 sends the deletion instruction to the image recording apparatus 50 (M12). Receiving the deletion instruction, the image recording apparatus 50 deletes the set of image data and the image data information associated with this set of image data from the image data storage 55 (M13). The data communications procedure between the mobile terminal 10 and the image recording apparatus 50 is carried out as described above.

As such, also in the present embodiment, when the short-range wireless communication is established between the mobile terminal 10 and the image recording apparatus 50, an image corresponding to a set of image data stored in the data storage 15 of the mobile terminal 10 is recorded onto a recording medium at the image recording apparatus 50. In this regard, when the set of image data stored in the data storage 15 of the mobile terminal 10 is stored in the image data storage 55, the transmission of the image data between the mobile terminal 10 and the image recording apparatus 50 is not performed, and the image is recorded onto the recording medium by using the set of image data stored in the image data storage 55. This reduces the burden of the communications process between the mobile terminal 10 and the image recording apparatus 50.

In addition to the above, according to the present embodiment, when a set of image data corresponding to an image displayed on the touch panel 17 of the mobile terminal 10 is changed, the set of image data stored in the image data storage 55 of the image recording apparatus 50 is deleted, with the result that the possibility of the leakage of the image data to the outside is reduced.

While in the present embodiment the tag is provided in the short-range wireless communication unit of the mobile terminal and the short-range wireless communication unit of the image recording apparatus is constructed as a reader/writer, the short-range wireless communication unit of the mobile terminal may be constructed as a reader/writer and the short-range wireless communication unit of the image recording apparatus may have a tag. In such a case, the print instruction information is stored in advance in a data storage or the like of the mobile terminal, and when the short-range wireless communication is established between the mobile terminal and the image recording apparatus, the CPU of the mobile terminal writes the print instruction information stored in the data storage or the like into the tag of the image recording apparatus by using the reader/writer of the short-range wireless communication unit.

Now, variations will be described. While in First Embodiment above the CPU 51 deletes a set of image data having the earliest image recording completion time among the sets of image data stored in the image data storage 55 from the image data storage 55 when the remaining storage amount of the image data storage 55 becomes equal to or smaller than the predetermined threshold, a set of image data which is the earliest set of data stored in the image data storage 55 may be deleted. Furthermore, the CPU 51 may delete the set of image data and the image data specific information stored in the image data storage 55 in cases other than those described in the embodiment above.

First Embodiment is arranged such that, when the short-range wireless communication is established between the mobile terminal 10 and the image recording apparatus 50, the CPU 51 does not delete a set of image data with which the deletion time stored in the deletion time storage 62 has elapsed from the image recording completion time among the sets of image data stored in the image data storage 55. Alternatively, a set of image data with which the deletion time may be deleted from the image data storage 55 even when the short-range wireless communication is established.

While in Second Embodiment the image data storage 55 is able to store only one set of image data, the image data storage 55 may be arranged to be able to store a plurality of sets of image data. In such a case, when the set of image data corresponding to the image displayed on the touch panel 17 is changed, the CPU 11 sends, to the image recording apparatus 50, the image data specific information and the user information corresponding to the set of image data before the change in the deletion instruction, and the CPU 51 of the image recording apparatus 50 deletes, from the image data storage 55, a set of image data associated with the image data specific information and the user information corresponding to the image data specific information and the user information included in the deletion instruction that the CPU 51 has received.

In addition to the above, while in First and Second Embodiments the image data storage 55 stores not only the image data specific information but also the user information in association with the image data, the user information may not be stored. In such a case, when receiving the print instruction information from the mobile terminal 10, the image recording apparatus 50 determines whether the image data storage 55 stores a set of image data associated with the image data information corresponding to the image data specific information included in the received print instruction information. Only when the image data storage 55 does not store the set of image data associated with the image data information, the image recording apparatus 50 sends the transmission request to the mobile terminal 10.

While in First and Second Embodiments above the communication setting information required for establishing the wireless communication is sent from one of the mobile terminal 10 and the image recording apparatus 50 to the other one, each of the mobile terminal 10 and the image recording apparatus 50 may be arranged to send its address information to the other. This makes it possible to certainly establish the wireless communication between the mobile terminal 10 and the image recording apparatus 50.

In the embodiments above, the CPU may execute the processes as a single CPU or execute the processes as a plurality of CPUs, a specific ASIC (application specific integrated circuit), or a combination of a CPU and a specific ASIC.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. An image recording system comprising a mobile terminal and an image recording apparatus configured to record an image onto a recording medium,
the mobile terminal including:
a mobile terminal data storage configured to store a set of image data and image data specific information for specifying the set of image data in association with each other;
a mobile terminal first communication unit configured to execute data communication with the image recording apparatus by first wireless communication which is established when the distance between the mobile terminal and the image recording apparatus becomes equal to or shorter than a predetermined communication range;
a mobile terminal second communication unit configured to execute data communication with the image recording apparatus by second wireless communication which is established based on communication setting information of each of the mobile terminal and the image recording apparatus and is higher in a transmission rate than the first wireless communication; and
a mobile terminal control unit configured to control the mobile terminal first communication unit and the mobile terminal second communication unit,
the image recording apparatus including:
an image recording apparatus first communication unit configured to execute data communication with the mobile terminal by the first wireless communication;
an image recording apparatus second communication unit configured to execute data communication with the mobile terminal by the second wireless communication;
an image recording apparatus storage unit configured to store the set of image data and the image data specific information in association with each other;
an image recording unit configured to record an image corresponding to the set of image data onto the recording medium; and
an image recording apparatus control unit configured to control the image recording apparatus first communication unit, the image recording apparatus second communication unit, and the image recording unit,
the mobile terminal control unit being configured to
execute at least one of transmission of the communication setting information regarding the mobile terminal and reception of the communication setting information regarding the image recording apparatus by the first wireless communication and control the mobile terminal first communication unit to send the image data specific information to the image recording apparatus by the first wireless communication, and
control the mobile terminal second communication unit to send the set of image data which is specified by the image data specific information and stored in the mobile terminal data storage to the image recording apparatus by the second wireless communication, when at least one of the mobile terminal first communication unit and the mobile terminal second communication unit receives a transmission request of the set of image data specified by the image data specific information, and
the image recording apparatus control unit being configured to,
when the image recording apparatus first communication unit receives the image data specific information,
control the image recording unit to record an image corresponding to the set of image data stored in the image recording apparatus storage unit onto the recording medium, when the image recording apparatus storage unit stores the set of image data associated with the image data specific information corresponding to the image data specific information received by the image recording apparatus first communication unit, and
when the image recording apparatus storage unit does not store the set of image data associated with the image data specific information corresponding to the image data specific information received by the image recording apparatus first communication unit, control the image recording apparatus first communication unit to send the transmission request to the mobile terminal by the first wireless communication and/or control the image recording apparatus second communication unit to send the transmission request to the mobile terminal by the second wireless communication, control the image recording unit to record an image corresponding to the set of image data received by the image recording apparatus second communication unit onto the recording medium in response to the transmission request, and store, in the image recording apparatus storage unit, the set of image data received by the image recording apparatus second communication unit and the image data specific information received by the image recording apparatus first communication unit in association with each other.

2. The image recording system according to claim 1, wherein,
the image recording apparatus control unit controls the image recording apparatus first communication unit to send, to the mobile terminal, the communication setting information including at least address information of the image recording apparatus by the first wireless communication, and
when receiving the communication setting information by the mobile terminal first communication unit, the mobile terminal control unit controls the mobile terminal second communication unit to establish the second wireless communication based on the communication setting information.

3. The image recording system according to claim 1,
the mobile terminal control unit controls the mobile terminal first communication unit to send the communication setting information including at least address information of the mobile terminal to the image recording apparatus by the first wireless communication, and
when receiving the communication setting information by the image recording apparatus first communication unit, the image recording apparatus control unit controls the image recording apparatus second communication unit to establish the second wireless communication based on the communication setting information.

4. The image recording system according to claim 1, wherein,
the image recording apparatus control unit deletes, after a predetermined time elapses from the completion of recording of the image corresponding to the set of image data onto the recording medium by the image recording unit, the set of image data based on which the recording onto the recording medium is completed and the image data specific information associated with the set of image data, from the image recording apparatus storage unit.

5. The image recording system according to claim 4, further comprising
a time setting unit by which the image recording apparatus sets the predetermined time.

6. The image recording system according to claim 1, wherein,
the image recording apparatus storage unit is configured to be able to store a plurality of sets of image data, and
when the remaining storage capacity of the image recording apparatus storage unit becomes equal to or smaller than a predetermined threshold, the image recording apparatus control unit deletes a set of image data having the earliest time at which recording of an image onto the recording medium by the image recording unit is completed, among the sets of image data stored in the image recording apparatus storage unit, and the image data specific information associated with that set of image data, from the image recording apparatus storage unit.

7. The image recording system according to claim 1, wherein,
the mobile terminal further includes a selection unit configured to select a set of image data to be recorded by the image recording apparatus,
the mobile terminal control unit generating the image data specific information regarding the set of image data selected by the selection unit and storing the set of image data and the image data specific information in the mobile terminal data storage.

8. The image recording system according to claim 7, wherein,
the mobile terminal further includes a display configured to display an image corresponding to the set of image data stored in the mobile terminal data storage, and
the selection unit selects the set of image data corresponding to the image displayed on the display as the set of image data to be recorded by the image recording apparatus.

9. The image recording system according to claim 7, wherein,
when the set of image data to be recorded by the image recording apparatus, which is selected by the selection unit, is changed, the mobile terminal control unit controls the mobile terminal second communication unit to send a deletion instruction to the image recording apparatus by the second wireless communication, and
when receiving the deletion instruction by the image recording apparatus second communication unit, the image recording apparatus control unit deletes, from the image recording apparatus storage unit, the set of image data and the image data specific information associated with the set of image data.

10. The image recording system according to claim 1, wherein,
when the first wireless communication is established, the mobile terminal control unit controls the mobile terminal first communication unit to send not only the image data specific information but also user information indicating a user of the mobile terminal to the image recording apparatus by the first wireless communication,
the image recording apparatus storage unit stores not only the image data specific information but also the user information in association with the set of image data,
when receiving the image data specific information and the user information by the image recording apparatus first communication unit, the image recording apparatus control unit is configured to
control the image recording unit to record an image corresponding to the set of image data stored in the image recording apparatus storage unit onto the recording medium, when the image recording apparatus storage unit stores the image data associated with the image data specific information and the user information corresponding to the image data specific information and the user information received by the image recording apparatus first communication unit and
when the image recording apparatus storage unit does not store the image data associated with the image data specific information and the user information corresponding to the image data specific information and the user information received by the image recording apparatus first communication unit, control the image recording apparatus first communication unit to send the transmission request to the mobile terminal by the first wireless communication and/or control the image recording apparatus second communication unit to send the transmission request to the mobile terminal by the second wireless communication, control the image recording unit to record an image corresponding to the set of image data received by the image recording apparatus second communication unit onto the recording medium in response to the transmission request, and store, in the image recording apparatus storage unit, the set of image data received by the image recording apparatus second communication unit and the image data specific information and the user information received by the image recording apparatus first communication unit in association with one another.

11. An image recording apparatus capable of communicating with a mobile terminal, comprising:
an image recording apparatus first communication unit configured to execute data communication with the mobile terminal by first wireless communication which is established when the distance between the mobile terminal and the image recording apparatus becomes equal to or shorter than a predetermined communication range;
an image recording apparatus second communication unit configured to execute data communication with the mobile terminal by second wireless communication which is established based on communication setting information of each of the mobile terminal and the image recording apparatus and is higher in a transmission rate than the first wireless communication;
an image recording apparatus storage unit configured to store a set of image data supplied from the mobile terminal and image data specific information by which the set of image data is specified, in association with each other;
an image recording unit configured to record an image corresponding to the set of image data onto a recording medium; and
an image recording apparatus control unit configured to control the image recording apparatus first communication unit, the image recording apparatus second communication unit, and the image recording unit,
the image recording apparatus control unit being configured to
receive the image data specific information transmitted from the mobile terminal by the image recording apparatus first communication unit,
receive the set of image data transmitted from the mobile terminal by the image recording apparatus second communication unit, and
when the image data specific information transmitted from the mobile terminal is received by the image recording apparatus first communication unit,
control the image recording unit to record an image corresponding to the set of image data stored in the image recording apparatus storage unit onto the recording medium, when the image recording apparatus storage unit stores the set of image data associated with the image data specific information corresponding to the image data specific information received by the image recording apparatus first communication unit, and
controls the image recording apparatus first communication unit to send a transmission request requesting the transmission of the set of image data specified by the image data specific information to the mobile terminal by the first wireless communication and/or control the image recording apparatus second communication unit to send the transmission request to the mobile terminal by the second wireless communication, when the image recording apparatus storage unit does not store the set of image data associated with the image data specific information corresponding to the image data specific information received by the image recording apparatus first communication unit, control the image recording unit to record, onto the recording medium, an image corresponding to the set of image data supplied from the mobile terminal to the image recording apparatus second communication unit in response to the transmission request, and store, in the image recording apparatus storage unit, the set of image data received by the image recording apparatus second communication unit and the image data specific information received by the image recording apparatus first communication unit in association with each other.

12. A non-transitory computer readable medium storing a control program executed by an image recording apparatus including: an image recording apparatus first communication unit configured to execute data communication by first wireless communication which is established when the distance between a sender and a receiver is shorter than a predetermined communication range; an image recording apparatus second communication unit configured to execute data communication by second wireless communication which is established based on communication setting information of each of the sender and the receiver and is higher in a transmission rate than the first wireless communication; an image recording apparatus storage unit configured to store a set of image data and image data specific information for specifying the set of image data in association with each other; and an image recording unit configured to record an image corresponding to the set of image data onto a recording medium,
when the image recording apparatus executes the control program,
the image recording apparatus first communication unit receiving the image data specific information from a mobile terminal,
the image recording apparatus second communication unit receiving the set of image data from the mobile terminal, and
when the image recording apparatus first communication unit receives the image data specific information transmitted from the mobile terminal,
the image recording unit being controlled to record an image corresponding to the set of image data stored in the image recording apparatus storage unit onto the recording medium, when the image recording apparatus storage unit stores the set of image data associated with the image data specific information corresponding to the image data specific information received by the image recording apparatus first communication unit, and
when the image recording apparatus storage unit does not store the set of image data associated with the image data specific information corresponding to the image data specific information received by the image recording apparatus first communication unit, the image recording apparatus first communication unit being controlled to send a transmission request requesting the transmission of the set of image data specified by the image data specific information to the mobile terminal by the first wireless communication and/or the image recording apparatus second communication unit being controlled to send the transmission request to the mobile terminal by the second wireless communication, the image recording unit being controlled to record, onto the recording medium, an image corresponding to the set of image data received by the image recording apparatus second communication unit from the mobile terminal in accordance with the transmission request, and the set of image data received by the image recording apparatus second communication unit and the image data specific information received by the image recording apparatus first communication unit being stored in the image recording apparatus storage unit in association with each other.

* * * * *